Patented Dec. 20, 1938

2,141,126

UNITED STATES PATENT OFFICE

2,141,126

PROCESS FOR PRODUCING VINYL RESIN SURFACE COATINGS

Arthur K. Doolittle, South Charleston, W. Va., assignor, by mesne assignments, to Union Carbide and Carbon Corporation, a corporation of New York No Drawing. Original application March 15, 1934, Serial No. 715,662. Divided and this application February 6, 1937, Serial No. 124,467

4 Claims. (Cl. 91—70)

This invention is concerned with improved vinyl resin compositions, and is specifically directed to processes for producing strongly adherent and resistant coatings and finishes on surfaces of various kinds.

The history of the development of vinyl resins is replete with suggestions for utilizing this interesting class of materials in surface coatings of all types. In this application of the vinyl resins many improvements and modifications of the first simple lacquer-like solutions have been proposed. However, physical and chemical characteristics inherent in the different classes of vinyl resins have largely precluded the widespread adoption of these materials as ingredients of surface coating compositions.

Thus, those vinyl resins which have the proper qualities of physical and chemical resistance have been found to be lacking in good adhesive properties, and for that reason cannot be used successfully over many surfaces, especially smooth surfaces, such as those presented by metals. On the other hand, those resins which are adequately adhesive have been proved to be deficient in resistance, both chemically and physically.

A principal object of this invention is to provide a vinyl resin composition by means of which strongly adherent and resistant surface coatings or finishes can be obtained. A further object is to provide a novel process for producing these adherent and resistant coatings.

By experimentation I have discovered that the objects of this invention can be achieved, and that strongly adherent coatings of vinyl resins which are chemically and physically resistant in those respects desired in surface coatings can be produced by subjecting the vinyl resin composition of the coating to baking at high temperatures. However, while baking for a short time produced excellent adherence of the normally non-adherent vinyl resins to metal and other smooth surfaces, the best baking temperatures have proved to be well above those temperatures at which vinyl resin films will normally begin to decompose. My researches have additionally shown that this latter obstacle can be overcome, and that baked coatings or finishes may be produced if heat stabilizers are used with the vinyl resins. Thus, my invention broadly comprises improved vinyl resin compositions which contain heat stabilizers, and the production of strongly adherent and resistant coatings or finishes on metal or other smooth surfaces, all as more fully hereinafter described.

The vinyl resins with which this invention is concerned are those which may be prepared by the conjoint polymerization of vinyl halides, such as vinyl chloride, with vinyl esters of the lower aliphatic acids, such as vinyl acetate, propionate, butyrate, and formate. Preferred resins of this type may be prepared from vinyl chloride and vinyl acetate, in the proportions of about 60 to 95 parts of vinyl chloride to from about 40 to 5 parts of the acetate. Particularly desirable resins of this preferred group are those which contain from about 80 to 90 parts of the chloride. The vinyl resins and their production form no part of my invention. They may be made, for example, by the process set out in the patent to E. W. Reid, No. 2,064,565, issued December 15, 1936.

The heat stabilizers which I use in this invention may be broadly classified into a group of metals and compounds of metals which form insoluble chlorine derivatives, or, in other words, metals and compounds thereof which form substantially water-insoluble products with chlorine and hydrogen chloride. Within this class, those materials which are in addition slightly basic in reaction show especially good stabilizing action. Lead sulfate, for example, functions well as a stabilizer, but it is not quite so effective as basic lead sulfate, and a mixture of basic lead sulfate and lead sulfite has been found to be particularly effective in preserving the stability of the resin.

Among numerous specific compounds useful in my invention, and falling within the class above indicated, are the following: blue lead (comprising a mixture of basic lead sulfate, lead sulfite, lead sulfide, zinc oxide, and a very small amount of carbon, and commercially available under the proprietary designation "Sublimed blue lead"), white lead, red lead, lead chromate, lead hydroxide, lead monoxide, lead phosphate, lead sulfate, basic lead sulfate, lead sulfide, lead sulfite, lead phenolate, lead butyrate, lead compounds of other alcohols or organic acids, antimony oxide, mercurous oxide, silver sulfite, copper silicate, cuprous oxide, copper metal and bismuth trioxide. It will be noted that lead compounds predominate in the above list, and, of the large number of stabilizers tested, lead compounds in general have proved to be most effective.

Various methods may be employed for incorporating the stabilizer into the vinyl resin, but I have found that effectiveness increases with the intimacy of association of the stabilizer and resin. Thus, a composition deposited from a solution of lead phenolate and vinyl resin dissolved in a mutual solvent requires less of the lead compound to effect adequate stabilization than is required when lead sulfite is milled into the resin. For this reason, it is desirable, but not essential, to use stabilizers which are finely divided and well dispersed in the vinyl resin, or to use those stabilizers which are soluble in organic solvents for the vinyl resins.

The amount of stabilizer may vary from 0.5% to 30% or even more of the formula weight, which means the total composition and may include solvents, plasticizers, dyes, pigments, and other ingredients. From this it follows that the proportions of stabilizer to vinyl resin may range between wide limits. For example, from 3 to 5 parts of stabilizer may be used to 1 part of vinyl resin, or 10 parts of vinyl resin may be used to 1 part of stabilizer. This is not to be understood as indicating that these proportions of stabilizer are required to prevent decomposition of the vinyl resin when the composition is baked, for the limits set forth are merely by way of example. It is possible to use many of the stabilizers of my invention as pigments, and when they serve a dual purpose in the composition, a quantity sufficient for both purposes is used. The quantity of stabilizer actually required may vary somewhat depending on the particular one chosen. For example, blue lead is not a single substance, but is a mixture containing some material of little or no stabilizing action. Therefore, a composition may require an amount of blue lead which is ten times the quantity of lead sulfite or some other undiluted stabilizer which is necessary, and even less lead phenolate or other soluble compound might be fully as effective as either.

The following examples will serve to illustrate this invention:

Example 1

A coating composition was made containing a vinyl resin resulting from the conjoint polymerization of vinyl chloride and vinyl acetate. The empirical composition of this resin was about 87 parts vinyl chloride and 13 parts vinyl acetate, and the resin was purified before use by extraction and partial precipitation from partial solvents to remove all unpolymerized material, catalytic residues, and more easily soluble polymeric fractions of lower average apparent molecular weight. The composition was as follows:

| | Percent by weight |
|---|---|
| Vinyl resin | 11.5 |
| Sublimed blue lead | 29.0 |
| Di (beta-butoxy ethyl) phthalate | 2.2 |
| Thinner | 57.3 |

The thinner, or solvent vehicle, was composed of the following solvents and non-solvents:

| | Percent by volume |
|---|---|
| Methyl isobutyl ketone | 40 |
| Dipropyl ketone | 10 |
| Toluene | 40 |
| Xylene | 10 |

This produced a coating of spraying viscosity in which the stabilizer, blue lead, served also as a pigment. Steel panels were given a spray coat of this composition, and, after air-drying, were baked for 1 hour at 350° to 400° F.

After baking, the coating adhered very strongly to the steel, and was characterized by total absence of decomposition of the vinyl resin.

This coating may serve as a prime coat over which additional coatings may be applied. Subsequent coats do not require a long bake, and will adhere well with very short bakes or after merely air-drying.

The finishes so produced are unique, not only in the excellent adherence of the vinyl resin which otherwise would adhere but poorly, but also in the quality of finish produced. These finishes are tough, hard and durable, and resist weathering, grease, humidity and other severe conditions of exposure to a remarkable degree.

Example 2

A composition was made up as follows:

| | Percent by weight |
|---|---|
| Vinyl resin | 9.5 |
| Blue lead | 4.2 |
| Antimony oxide | 1.75 |
| Titanium oxide | 15.75 |
| Chrome yellow | 1.1 |
| Di (beta-butoxy ethyl) phthalate | 3.5 |
| Blown castor oil | 0.2 |
| Thinner | 64.0 |

In this composition the vinyl resin and thinner used were the same as those described in Example 1.

The composition above is a light-colored, pigmented enamel in which both blue lead and antimony oxide are used as stabilizers.

This coating was sprayed onto steel panels, and, after air-drying, it was baked for 1 hour at 350° to 400° F. The resulting finish was very hard and resembled porcelain in appearance. It is characterized by excellent adherence to the metal, and by the unique resistance which distinguishes all finishes embodying my invention.

Example 3

The following composition was made up to produce a clear finish:

| | Per cent by weight |
|---|---|
| Vinyl resin | 15 |
| Lead phenolate | 1.5 |
| Thinner | 83.5 |

The vinyl resin and thinner used in this composition were the same as those referred to in the two preceding examples.

This composition results in a perfectly clear coating of excellent protective power. It was sprayed over polished steel panels, and, after air-drying, was baked 1 hour at 350° F. It had excellent adherence, and, the total absence of any coloration or decrease in clarity of the film showed conclusively that no decomposition of the vinyl resin occurred.

The foregoing examples are merely illustrative of my invention, and relate to specific embodiments of it. Other vinyl resins may be used, but this invention is directed especially to those which may be produced by conjoint polymerization of vinyl halides, and vinyl aliphatic esters, and which normally are deficient in adhesion to metals or other smooth surfaces. A variety of solvents, plasticizers, coloring materials and modifying materials may be present in the compositions, and those shown are in no way significant to my invention. The baking temperatures may vary from those indicated in the examples, but they are usually above about 300° F. In general, those temperatures which are above the decomposition point of the vinyl resin alone are satisfactory. The time of baking is not critical, and the actual length of the bake required will vary somewhat with the size of the article finished. For most articles, the time of baking will range from about 15 minutes to 2 hours.

Modifications other than those indicated above are also possible, and are included in the invention as defined by the appended claims. This application is a division of my copending application Serial No. 715,662, filed March 15, 1934.

I claim:

1. Process for producing strongly adherent and resistant surface coatings which includes the steps of forming on a surface a coating essentially comprising a vinyl resin substantially identical with a resin resulting from the conjoint polymerization of a vinyl halide with a vinyl ester of an aliphatic acid together with an inorganic compound of lead which forms insoluble chlorine derivatives, and thereafter baking said coating at a temperature at which said vinyl resin would be decomposed in the absence of said compound of lead.

2. Process for producing strongly adherent and resistant surface coatings which includes the steps of forming on a surface a coating essentially comprising a vinyl resin substantially identical with a resin resulting from the conjoint polymerization of a vinyl halide with a vinyl ester of an aliphatic acid, said vinyl resin in said coating being in intimate contact with a stabilizing agent selected from the group consisting of blue lead, white lead, red lead, lead chromate, lead hydroxide, lead monoxide, lead phosphate, lead sulfate, basic lead sulfate, lead sulfide, lead phenolate, and lead butyrate, and thereafter baking said coating at a temperature at which said vinyl resin would be decomposed in the absence of said stabilizing agent.

3. Process for producing strongly adherent and resistant coatings on metal surfaces which includes forming on said surfaces a coating essentially comprising a vinyl resin substantially identical with a resin resulting from the conjoint polymerization of vinyl chloride with vinyl acetate and containing from 80% to 90% by weight of vinyl chloride, together with blue lead, and thereafter baking said coating at a temperature at which said vinyl resin would be decomposed in the absence of said blue lead.

4. Process for producing strongly adherent and resistant coatings on metal surfaces which includes forming on said surfaces a coating essentially comprising a vinyl resin substantially identical with a resin resulting from the conjoint polymerization of vinyl chloride with vinyl acetate and containing from 80% to 90% by weight of vinyl chloride, together with a mixture of basic lead sulfate and lead sulfite, and thereafter baking said coating at a temperature at which said vinyl resin would be decomposed in the absence of said mixture of lead compounds.

ARTHUR K. DOOLITTLE.